Sept. 22, 1964   A. C. BERNSTEIN   3,149,895
ELECTRICAL CONNECTION FOR CIRCUIT COMPONENT TO PANEL CONDUCTOR
Filed Aug. 23, 1961

INVENTOR
ALLAN C. BERNSTEIN

BY Burgess, Dinklage & Sprung
ATTORNEYS

United States Patent Office 3,149,895
Patented Sept. 22, 1964

3,149,895
ELECTRICAL CONNECTION FOR CIRCUIT
COMPONENT TO PANEL CONDUCTOR
Allan C. Bernstein, Kings Point, N.Y., assignor to
Executone Inc., New York, N.Y., a corporation of
New York
Filed Aug. 23, 1961, Ser. No. 133,489
5 Claims. (Cl. 339—17)

This invention relates to an electrical circuit component and an electrical connection for use therewith.

In many forms of electrical apparatus, as a substitute for wiring, conductors are printed on a base by a process which produces strips of metallic conductors adhering to the base. Apparatus such as relays and the like for connection to the conductors are suitably attached to the base more or less permanently and in the past have required somewhat elaborate connections to the conductors on the base, sometimes involving soldered joints and other such inconvenient expedients.

It is an object of this invention to provide an electric circuit component which employs a convenient reliable means of connection for completing circuits including such conductors which is easily detachable, assures good electrical contact, is simple and inexpensive.

Other objects of the invention will be in part obvious and in part pointed out hereinafter.

Figure 1:
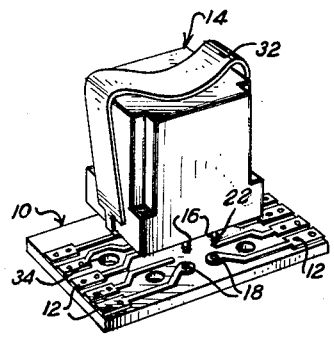
FIG. 1 is a perspective view of an electrical circuit component constructed in accordance with the practice of the invention.

Referring to the drawing and more particularly to FIG. 1, the electrical circuit component consists of a base 10 in the form of a plate of insulating material upon which are printed by a well-known method a plurality of conductors 12 laid out for the purpose of completing circuits controlled by a suitable relay or other complementary member 14 shown tilted on base 10 to expose a pair of lugs 16 adapted to be connected to adjacent conductors 12.

Lug 16 fixed to relay 14 is adapted to extend to a hole 18 in conductor 12 and also through the base plate 10.

Figures 2, 3:
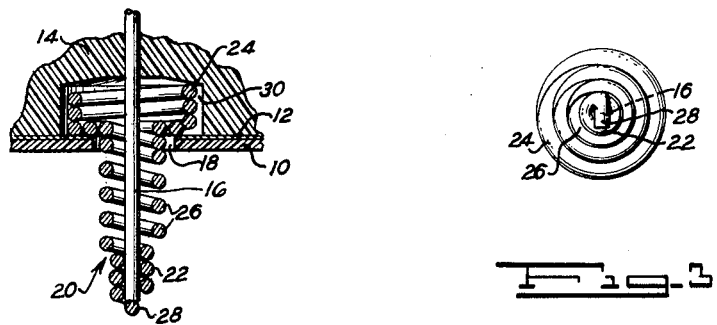
FIG. 2 is a fragmentary view partly in section of the electrical circuit component in place on the support plate.
FIG. 3 is an end view of coil spring used for assuring electrical contact.
Figure 4:
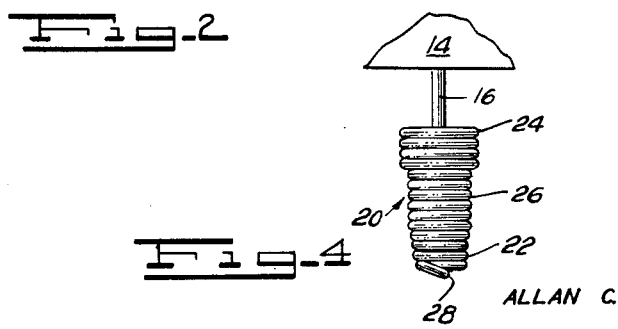
FIG. 4 is a fragmentary side elevation showing the coil spring positioned on the lug of the electrical circuit component.

Electrical connection between lug 16 and conductor 12 is effected by a coil spring 20 which at one end is provided with a plurality of coils of small diameter shown at 22 which grippingly fit onto lug 16 assuring good electrical contact between the spring and the lug. The other end of spring 20 comprises a plurality of coils 24 of larger diameter than the hole 18 and adapted to lie on the face of conductor 12. Intermediate the two portions 22 and 24 of spring 20 is a portion 26 having a plurality of coils of diameter larger than the portion 22 and adapted to fit through the hole 18. At the end of spring 22, the end 28 is bent over to engage the end of lug 16. The coil spring 20 is shown tensioned, i.e., stretched in FIG. 2. In its unstretched condition the same appears identical except that the coils contact one another as shown in FIG. 4. It is apparent that in this untensioned condition the length of the spring is less than the projecting length of the lug 16, as the lug 16 stretches the spring coils 26 when positioned as shown in FIG. 2.

Thus, when member 14 is in place on base 10, spring 20 is flexed particularly in the intermediate portion 26 so that end section 24 is held under pressure in contact with the conductor 12. The interior of member 14 is recessed as at 30 to receive the enlarged end 24 of spring 20.

To hold member 14 in place on base 10 preferably a spring 32 is provided which fits into holes 34 in base 10 removably holding member 14.

From the above it will be seen that member 14 may readily be removed from base 10 and while in place good contact will be assured by contact with the enlarged portion 24 lying on conductor 12.

To avoid corrosion and assure good electrical contact the steel body of the spring 20 may be plated as for example gold-plated which is an inexpensive operation.

Due to the flexing of the intermediate portion 26 of the spring, unusual manufacturing tolerances are permissible particularly with respect to the degree to which the lug 16 protrudes below the bottom of member 14 without interfering with good electric contact between the spring and the conductor 12. The manner in which the reduced diameter of coils 22 grippingly fits on the lug 16 furthermore insures that once the connectors have been pushed on the lugs they will remain there and will not fall off even when the member 14 is removed from the board for inspection, repair, etc.

Thus by the above construction are accomplished among others the objects hereinbefore referred to.

I claim:

1. A solderless electrical connection comprising a conductor having a hole therethrough, a lug for connection to said conductor extending through said hole, a coil spring of untensioned length less than the exposed length of said lug encircling said lug and extending through said hole, said coil spring having:
   (a) an end portion of reduced diameter gripping the end of said lug and preventing passage of the lug end therethrough,
   (b) an opposite end portion with coils larger than said hole contacting said conductor, and
   (c) an intermediate portion with coils smaller than said hole stretched under tension by the length of said lug to thereby maintain contact of said larger coils with said conductor.

2. Connection according to claim 1 in which the end of said end portion of said spring of reduced diameter extends across the tip of said lug in contact therewith.

3. Connection according to claim 1 in which said conductor comprises a portion of a printed circuit on a base.

4. Connection according to claim 3 in which said lug is on a component removably secured to said base.

5. Connection according to claim 4 in which said component is removably secured to said base with a spring clip.

References Cited in the file of this patent
UNITED STATES PATENTS
2,796,497     Barden et al. _____ June 18, 1957
2,902,629     Little et al. _____ Sept. 1, 1959

FOREIGN PATENTS
7,064     Great Britain _____ of 1903